United States Patent [19]

Wiltshire et al.

[11] Patent Number: 5,719,654
[45] Date of Patent: Feb. 17, 1998

[54] LIQUID CRYSTAL FABRY PEROT FILTER DEVICE HAVING A PEAK OPERATING WAVELENGTH OF 10.6 MICRONS

[75] Inventors: Michael Charles Keogh Wiltshire, High Wycombe; Gregory Stuart Taylor, St. Albans, both of United Kingdom

[73] Assignee: Videojet Systems International, Inc., Wooddale, Ill.

[21] Appl. No.: 535,228

[22] PCT Filed: Apr. 29, 1994

[86] PCT No.: PCT/GB94/00931

§ 371 Date: Nov. 13, 1995

§ 102(e) Date: Nov. 13, 1995

[87] PCT Pub. No.: WO94/25895

PCT Pub. Date: Nov. 10, 1994

[30] Foreign Application Priority Data

Apr. 30, 1993 [GB] United Kingdom ............... 9309003

[51] Int. Cl.⁶ .......................... G02F 1/1333; G02F 1/13; G02F 1/03; G02F 1/07
[52] U.S. Cl. .......................... 349/158; 349/172; 349/198; 359/260
[58] Field of Search .......................... 359/70, 71, 82, 359/93, 100, 260; 349/198, 113, 114, 158, 172

[56] References Cited

U.S. PATENT DOCUMENTS

| 4,926,177 | 5/1990 | Sakata | 341/137 |
| 5,150,236 | 9/1992 | Patel | 359/94 |
| 5,381,253 | 1/1995 | Sharp et al. | 349/198 |
| 5,510,914 | 4/1996 | Liu et al. | 349/171 |

FOREIGN PATENT DOCUMENTS

| WO 92/04653 | 3/1992 | WIPO . |
| WO 93/10477 | 5/1993 | WIPO . |

OTHER PUBLICATIONS

Masterson et al., "Ferroelectric Liquid–Crystal Tunable Filter", Optics Letters, vol. 14, No. 22, Nov. 15 1989, pp. 1249–1251.

OPTICS LETTERS, vol. 17, No. 6, Mar. 1992, New York, US, pp. 456–458, XP000258278, J. S. Patel, *Electrically tunable ferroelectric liquid–crystal Fabry–Perot filter.*

*Primary Examiner*—William L. Sikes
*Assistant Examiner*—Walter Malinowski
*Attorney, Agent, or Firm*—Kirschstein, et al.

[57] ABSTRACT

An electrically-controllable liquid crystal filter device comprises two partially-reflecting substrate structures mounted substantially parallel to each other with a space therebetween to form a Fabry-Perot filter. A layer of ferroelectric liquid crystal material is disposed in the space, the liquid crystal material being switchable, by application of an electric field, between different refractive index values whereby the device is switchable between transmissive and reflective states for light of a particular narrow wavelength band. The spacing of the substrate structures is selected in relation to the wavelength of light to be transmitted, such that the Fabry-Perot filter operates in a low order state, which may be the first order.

5 Claims, 2 Drawing Sheets

FIG. 1
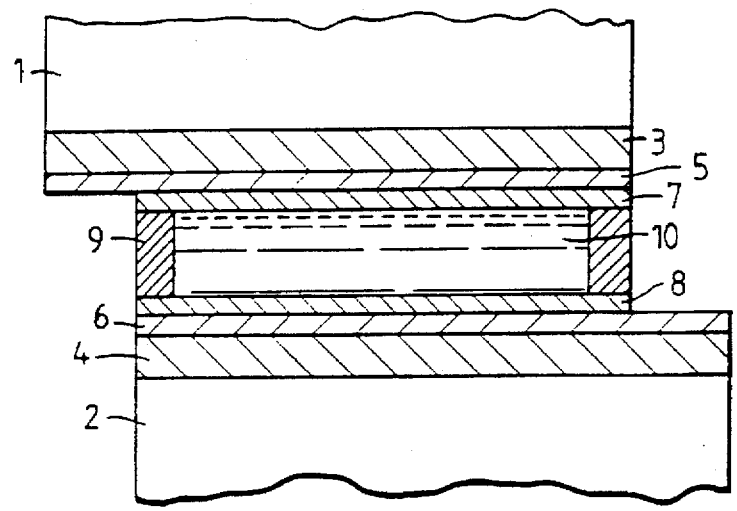
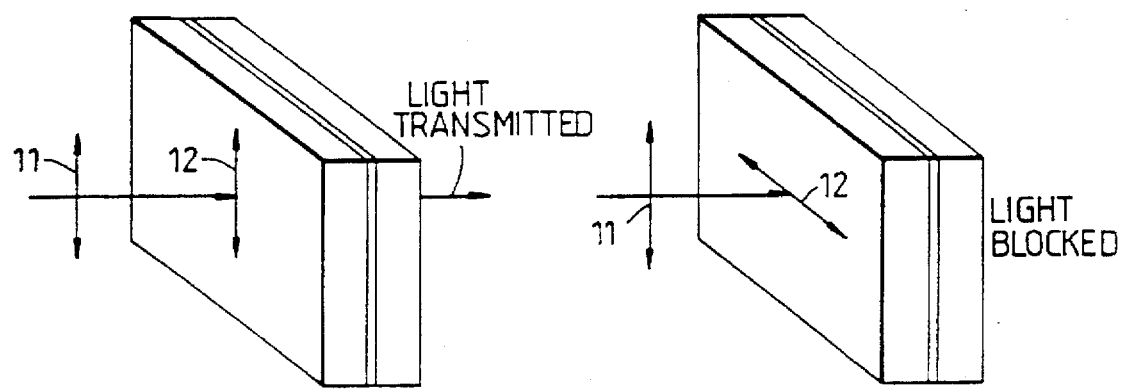
FIG. 2(a)     FIG. 2(b)

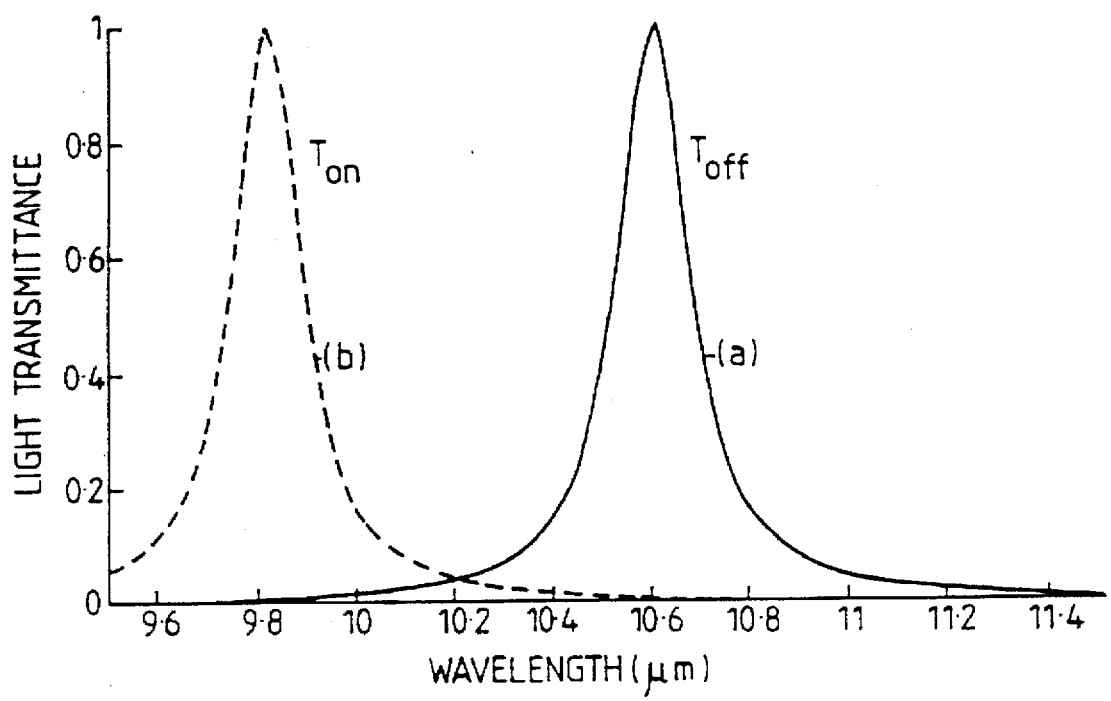

LIQUID CRYSTAL FABRY PEROT FILTER DEVICE HAVING A PEAK OPERATING WAVELENGTH OF 10.6 MICRONS

BACKGROUND OF THE INVENTION

This invention relates to optical devices and particularly to a liquid crystal shutter for operation in the infrared or other long light wavelength region.

Liquid crystal (LC) shutters operating in the visible region of the light spectrum are well known, and there are several alternative types, which have different characteristics. The simplest is the common twisted nematic shutter which has a switching time of about 30 msec. Fast response using a nematic liquid crystal material can be obtained from the II-cell (British Patent Application No. 2184860A) which achieves a switching time of about 1 m sec. However, the fastest commonly available liquid crystal shutter relies on ferroelectric liquid crystal technology and switches in less than 100 μsec. In all cases, a critical parameter of the design of the device is the product of birefringence (Δn)×thickness (d) and in particular its ratio with the wavelength of operation. All of the above devices ideally require and to equal $\lambda/2$ where $\lambda$ is the light wavelength of interest, normally taken as 550 nm for operation in the visible light spectrum.

It will therefore be apparent that there is considerable difficulty in implementing a fast shutter to operate at long wavelengths, such as 10.6 μm, the most common wavelength of the $CO_2$ laser. This is because the product Δnd is now required to be about 20 times larger than is required for visible light operation. Since the birefringence Δn varies only slightly, and if anything it decreases at longer wavelengths, the thickness of the liquid crystal layer must be increased. However, in nematic devices, the response time varies as the square of the LC layer thickness, whereas ferroelectric LC devices (FLCDs) cease to function correctly if the layer becomes too thick. Hence, no fast-acting shutter can be implemented using conventional LC shutter technology which can be used at long wavelengths.

Shutters can be classified into two types, namely those which operate over a broad range of wavelengths, and those which are effective over only a restricted range of wavelengths. All of the devices described above are broadband operating; although they are most efficient at the design wavelength, $\lambda_0$, they have useful performance for a range, say, $\lambda_0 \pm \lambda_0/4$. However, in some cases such a broadband capability is not needed, for example when modulating a laser line. Then the shutter needs to be effective only at a single wavelength, or over a very narrow band of wavelengths. Such a device would, for example, be of great value in controlling the output of the $CO_2$ laser mentioned above, which is used for a variety of marking, cutting and welding operations in fields ranging from surgery to ceramic circuit board manufacture.

It is an object of the present invention to provide a fast-acting LC shutter suitable for use with lasers or other narrow-band light sources.

According to the invention there is provided an electrically-controllable liquid crystal filter device comprising two partially-reflecting substrate structures mounted substantially parallel to each other with a space therebetween to form a Fabry-Perot filter; a layer of ferroelectric liquid crystal material disposed in said space, said liquid crystal material being switchable, by application of an electric field thereto, between different refractive index values whereby the device is switchable between transmissive and reflective states for light of a particular wavelength, characterised in that, the spacing of the substrate structures is such that the wavelength of light to be transmitted is 10.6 μm, and in that the Fabry-Perot filter operates in a low order state (as hereinbefore defined).

BRIEF DESCRIPTION OF THE DRAWINGS

Embodiments of the invention will now be described, by way of example, with reference to the accompanying drawings, in which FIG. 1 is a schematic cross-sectional view of a liquid crystal shutter device in accordance with the invention, FIGS. 2(a) and 2(b) are schematic pictorial views illustrating the operation of the device, and FIG. 3 comprises curves showing the transmission spectra obtained in two operating states of the device.

DETAILED DESCRIPTION OF THE PREFERRED EMBODIMENTS

Referring to FIG. 1, a liquid crystal shutter device comprises two flat substrates 1 and 2, which are transparent to light at the required operating wavelength. For example, for operation at a wavelength of 10.6 μm, germanium or zinc selenide may be used as the substrate material. The substrate 1 has a partially-reflecting mirror 3 on its lower surface (as viewed in FIG. 1) and the substrate 2 has such a mirror 4 on its upper surface. The mirrors 3 and 4 may be multilayer dielectric stacks, which provide a reflectivity of, say, 95%. The precise value of reflectivity is preferably selected to optimize the performance of the device. Each mirror is then coated with an electrode layer 5,6, respectively, of transparent electrically-conductive material, although such layers may be omitted if the substrates and/or the mirrors include conductive layers. The layers 5 and 6 are preferably thin (for example less than 30 nm thickness) layers of, for example, Indium Oxide ($In_2O_3$) or Indium Tin Oxide (ITO), the material being selected to have minimum light absorption at the wavelength of interest. Alternatively, the electrode layers 5, 6 if provided, may be disposed between the substrates 1, 2 and the mirrors 3, 4. The mirror surfaces, or the surfaces of the electrode layers 5, 6 if provided, are treated with thin layers 7, 8, respectively, which act to align the moleculus of a liquid crystal layer 10 which is enclosed therebetween. The layers 7 and 8 may be, for example, rubbed polymer layers or evaporated silicon oxide layers. The two halves of the structure are held apart by spacers (not shown), and the liquid crystal material 10 is retained in the space between the layers 7 and 8 by an adhesive seal 9, which may be an epoxy resin.

The device of the present invention comprises primarily a Fabry-Perot (FP) filter. This comprises two parallel, partially-reflecting mirrors, separated by a small distance, d. The transmission spectrum is comb-like, with the peaks separated uniformly in inverse wavelength by ½nd, where n is the refractive index of the medium in the cavity between the mirrors. If this is a liquid crystal material, as in the present invention, transmission wavelength can be altered, because the refractive index can be controlled. The sharpness of the peaks is determined by the reflectivity of the mirror. Normally, FP filters are operated in high order, i.e. the peak wavelength $\lambda_m$ is much smaller than the mirror separation d, where $\lambda_m$ is given by $m\lambda_m = 2nd$ where m is a large integer (typically 50).

In the present invention, however, the device is operated in a low order state, which may be the first order. The term "low order state" in this specification means that in the above equation ($m\lambda_m=2nd$), m is less than. This allows a thin layer of liquid crystal material to be used, thereby achieving the desired speed of operation of the device. In common with most other liquid crystal devices, the device of the present invention requires polarized light to operate correctly. However, the majority of lasers generate polarized light, so this is not a disadvantage.

The material of the layer 10 is a ferroelectric semantic C liquid crystal material, selected such that the smectic C cone angle is 45°. An example of such material is a mixture designated CS2004 which is available from Chisso Petrochemical Corporation of Ichihara, Japan. Using this material in the structure of FIG. 1, the resulting device has two stable states, the optic axes of which are 90° apart. Switching between these two states is controlled by the sign of the voltage applied between the conductive electrode layers; one optic axis orientation is selected by a voltage of one polarity, the other by the opposite polarity.

When polarized light from a laser impinges on the liquid crystal layer 10, the light experiences, in one operating state of the device, a Fabry-Perot cavity of optical thickness $n_o d$, whereas in the other state the optical thickness is $n_e d$, where $n_o$ and $n_e$ are the ordinary and extraordinary refractive indices, respectively, of the liquid crystal material, and d is the mirror separation.

Although the difference between $n_e$ and $n_o$ may vary for different liquid crystal materials over a range of, say, 0.05 to 0.2, typical values of $n_e$ and $n_o$ are about 1.6 and about 1.5, respectively, even at a wavelength of 10.6 µm. Taking the latter values, a device using a liquid crystal layer 3.313 µm thick will be light transmissive for light of wavelength 10.6 µm if the light is polarized parallel to the optic axis of the liquid crystal material. FIG. 2(a) illustrates this situation, wherein an arrow 11 indicates the direction of polarization of the light and an arrow 12 indicates the optic axis of the liquid crystal material. On the other hand, if the liquid crystal is switched so that the light is polarized perpendicular to the optic axis as shown in FIG. 2(b), the transmissive peak wavelength moves to about 9.94 µm and blocks the laser beam, transmitting only a small fraction of the light at 10.6 µm. For example, if the mirror reflectivity is 95%, only 1.7% of the light is transmitted in this state, leading to a contrast ratio of 58.

The transmission spectra of the two cases are shown in FIG. 3, curves (a) and (b) showing the spectra for the FIG. 2(a) and FIG. 3(a) situations, respectively. The contrast ratio (CR) of this device depends on the mirror reflectivity and the refractive indices of the liquid crystal material, as follows:

$$CR = 1 + \frac{4R}{(1-R)^2} \sin^2\pi \left[ \frac{n_o}{n_e} \right]$$

where R is the reflectivity of the mirror. This ratio can therefore be altered by selecting the appropriate liquid crystal and mirror combination. Moreover, because the liquid crystal layer is thin, the material operates within the so-called surface-stabilized regime and switching is fast, for example much less than 100 µsec.

To summarize, the embodiment which has been described provides a fast-acting liquid crystal shutter suitable for operating on polarized light at long wavelength. This device would be ideally suited for use with a $CO_2$ laser at a light wavelength of 10.6 µm. It comprises a liquid crystal Fabry-Perot device designed to operate in ow order and to exploit the effects of multiple interference to achieve rapid switching using a thin layer of ferroelectric liquid crystal material.

We claim:

1. An electrically-controllable, liquid crystal Fabry-Perot filter device, comprising:
   (a) two partially-reflecting substrate structures mounted substantially parallel to each other and spaced apart by a spacing d;
   (b) a layer of a ferroelectric liquid crystal material located in said spacing and having a refractive index n;
   (c) means for switching the device between transmissive and reflective states for light having a peak operating wavelength $\lambda_m$ equal to 10.6 µm hy applying an electric field to said liquid crystal material to change the refractive index n to different values in said states; and
   (d) said spacing d being selected to satisfy the equation:

$m\lambda_m 2nd,$ where m is an integer less than 5.

2. The device of claim 1, wherein the liquid crystal material is a smectic C ferroelectric liquid crystal material having a cone angle of 45°.

3. The device of claim 1, wherein each substrate structure is germanium selenide.

4. The device of claim 1, wherein each substrate structure is zinc selenide.

5. The device of claim 1, wherein the light is emitted from a $CO_2$ laser.

* * * * *